United States Patent Office 3,404,348
Patented Oct. 1, 1968

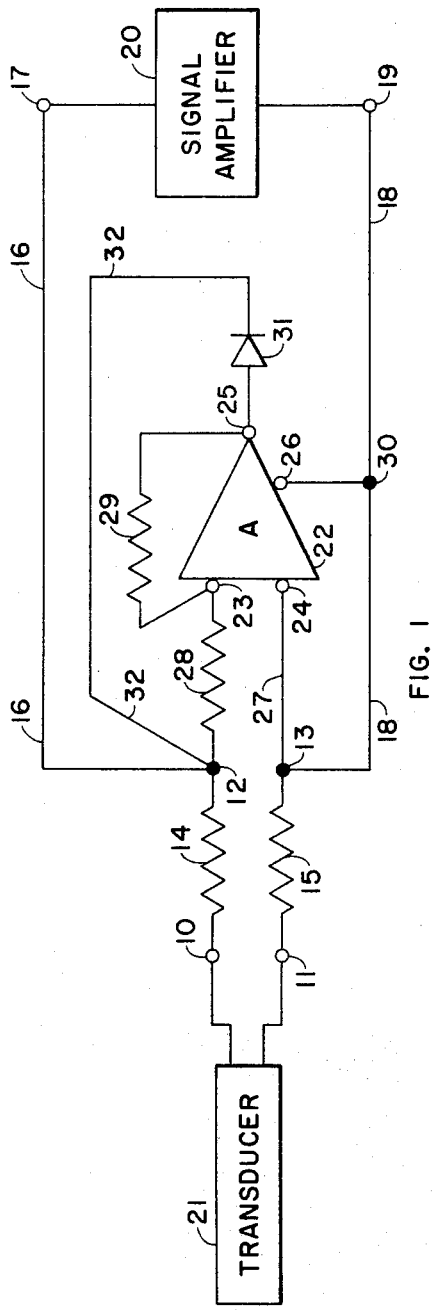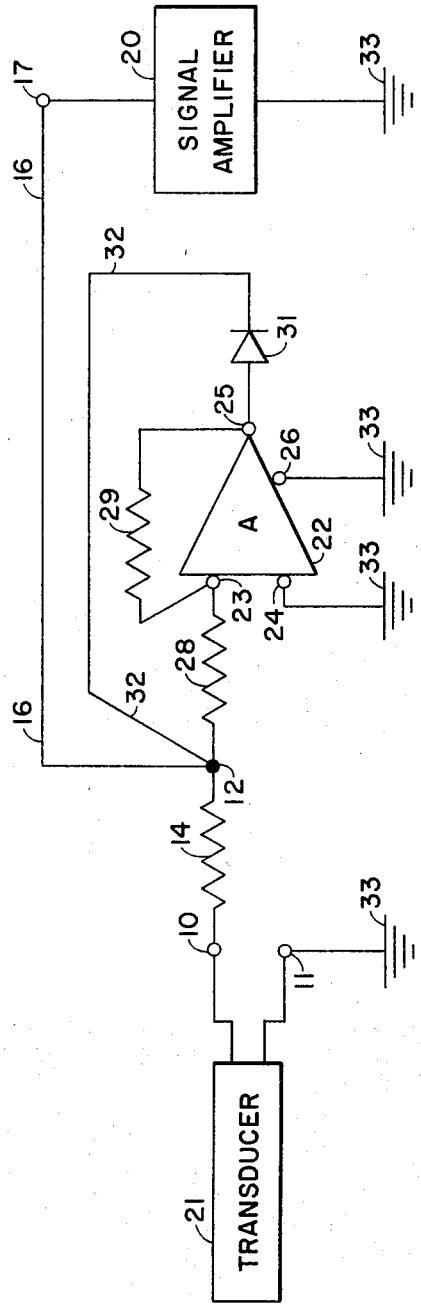
INVENTORS
IRVING G. HANSEN
VICTOR S. PETERSON
ATTORNEYS

3,404,348
LOW LEVEL SIGNAL LIMITER
Irving G. Hansen, Bellevue, and Victor S. Peterson, Sandusky, Ohio, assignors to the United States of America as represented by the Administrator of the National Aeronautics and Space Administration
Filed Sept. 22, 1966, Ser. No. 582,213
10 Claims. (Cl. 330—103)

The invention described herein was made by employees of the United States Government and may be manufactured and used by or for the Government of the United States of America for governmental purposes without the payment of any royalties thereon or therefor.

This invention relates to electronic limiting circuits and is dircted more particularly to a low level signal limiter.

As is well known, signal amplifying devices are designed to accept signal input voltages within a certain range of magnitude. If the input signal is excessive, the amplifier may saturate or become nonlinear in operation, both of these results being normally undesirable.

An example of an instance in which an excessive signal may be applied to an amplifier occurs with regard to equipment utilized in the measurement of the temperature of extremely cold bodies, as for example, cryogenic fluids. When the probes used to make such measurements are subjected to normal room temperatures, the signal voltage of such probes become so great that the amplifiers into which the signal is being fed become overloaded. This problem has been overcome to a large extent by the use of limiting circuits which prevent the signal voltage from excedeing a predetermined value.

However, none of the prior art limiting circuits are completely satisfactory where a signal voltage is to be limited to a low level such as on the order of 12 millivolts. One of the reasons for the unsatisfactory performance of prior art limiting circuits is that the signal to be limited must pass through an operational amplifier section included in the limiting circuit. Consequently, the signal level is affected by the zero drift, the gain drift, and non-linearities of the operational amplifier. Additionally, in limiting circuits of the prior art, the output voltage of the operational amplifier adds to the signal voltage so that the signal voltage as supplied to a signal amplifier includes an error component.

Accordingly, it is an object of the invention to provide a novel limiting circuit which prevents a signal being supplied to a signal amplifier from exceeding a predetermined value.

It is another object of the invention to provide a limiting circuit in which the output voltage of an operational amplifier included therein is prevented from adding to the signal voltage.

It is a further object of the invention to provide a limiting circuit in which the zero drift, gain drift and non-linearities of the operational amplifier included therein do not affect the signal level.

Still another object of the invention is to provide a limiting circuit in which the summing point shifts from the input of the operational amplifier to the output of the limiting circuit when the signal level increases to a predetermined value.

It is yet another object of the invention to provide circuitry of the above type in which a signal voltage is fed directly to a signal amplifier without passing through the operational amplifier and, consequently, is not altered undesirably thereby.

An additional object of the invention is to provide a limiting circuit in which an operational amplifier is controlled by the voltage supplied to the signal amplifier input and provides a correcting voltage to that point when the signal voltage exceeds a predetermined value.

Other objects and advantages of the invention will become apparent from the following description and accompanying drawings in which:

FIG. 1 is a schematic diagram of circuitry embodying the invention; and

FIG. 2 is a schematic diagram of circuitry embodying the invention but modified with respect to the electrically common connections.

Referring to FIG. 1, it will be seen that the limiting circuit embodying the invention may include signal input terminals 10 and 11 which are connected to respective junction points 12 and 13 through respective isolating resistors 14 and 15. These resistors provide isolation between the input terminals 10, 11 and the junction points 12, 13 because of their resistance values. A lead 16 connects the junction point 12 to a signal output terminal 17 while a lead 18 connects the junction point 13 to a signal output terminal 19. To amplify a signal voltage supplied to the signal input terminals 10 and 11 from a transducer 21, a signal amplifier 20 may be connected between the signal output terminals 17 and 19. The transducer 21 may be, by way of example, a temperature probe for cryogenic liquids together with a bridge circuit or other signal conditioning circuit.

With the foregoing arrangement, it will be seen that the voltage appearing at the signal output terminals 17, 19 of the limiting circuit and across the signal amplifier 20 will be identical to that between the junction points 12 and 13 because of the direct metallic connections established by the leads 16 and 18. The voltage appearing between these junction points is slightly less than the signal voltage applied to the signal input terminals 10 and 11 due to the presence of the resistors 14 and 15.

In order to limit the signal voltage supplied to the signal amplifier, the potential between the junction points 12 and 13 must be limited to a predetermined value which is within the range of voltages which may be supplied to the signal amplifier 20 without causing it to operate in a nonlinear region or without otherwise adversely affecting its operation. To this end, there is provided an operational amplifier 22 having input terminals 23 and 24 and output terminals 25 and 26. Input driving voltage is supplied to the operational amplifier 22 by means of a lead 27 connected between the junction point 13 and input terminal 24 and, through a dropping resistor 28 connected between the junction point 12 and the input terminal 23.

When the voltage appearing between the junction points 12 and 13 is less than the value to which it is to be limited, no limiting action is required and, therefore, the voltage applied to the input terminals 23 and 24 of the operational amplifier 22 should be maintained at substantially zero magnitude. This is accomplished by providing a first negative feedback network which may comprise a resistor 29 connected between the output terminal 25 and the input terminal 23 of the operational amplifier 22. It will be understood by those skilled in the art that a capacitor and/or an inductor may be substituted for the resistor 29 or connected in series or parallel therewith depending on the feedback characteristic desired. The output terminal 26 of the operational amplifier 22 is connected to the lead 18 at a junction point 30 to provide an electrically common connection to the lead 18.

As explained previously, it is desired to prevent the voltage appearing between the junction points 12 and 13 from exceeding a predetermined magnitude. To this end, there is provided a nonlinear feedback network comprising a unidirectional current conducting device such as a diode 31 having its anode electrode connected to the output terminal 25 of the operational amplifier 22 and having its cathode electrode connected to the junction point 12 by means of a lead 32. Since the junction point 12 is connected to the limiting amplifier output terminal 17 by the lead 16, the cathode electrode of the diode 31 is directly connected to the terminal 17. Accordingly, it will be seen that the output voltage of the operational amplifier 22 as seen at the terminals 25 and 26 is applied to the signal amplifier 20 at terminals 17 and 19 through the diode 31.

The diode 31 has a prescribed threshold voltage and will not conduct until the voltage impressed thereon exceeds this threshold value. Consequently, no voltage will be fed back from the output terminal 25 to the junction point 12 until the output voltage of the operational amplifier exceeds the prescribed threshold voltage of the diode 31. The diode 31 serves as a voltage dropping means having a prescribed threshold voltage.

Operation of the foregoing circuitry will now be described.

Taking 12 millivolts as an exemplary predetermined value to which the input voltage of the signal amplifier 20 must be limited, the voltage between the junction points 12 and 13 must be limited to this same value because of the direct metallic connections to the signal output terminals 17 and 19 as previously described. When the signal voltage being applied to the signal input terminals 10 and 11 is substantially less than 12 millivolts, the voltages between the junction points 12 and 13 will be slightly less than the signal voltage at the input terminals 10 and 11 due to the resistors 14 and 15. Similarly, the driving voltage at the input terminals 23 and 24 of the operational amplifier 22 should be only slightly less than the voltage between the terminals 12 and 13 because of the dropping resistor 28. However, because of the negative feedback provided by resistor 29 from the operational amplifier the voltage between the input terminals 23 and 24 is held to substantially zero voltage. The gain of the operational amplifier is chosen so as to maintain the voltage between the terminals at substantially zero, the gain being determined by the ratio of resistor 29 to resistor 28 as is well known to those skilled in the art.

Under the foregoing operating conditions, the diode 31 is nonconductive. Assuming now that the voltage supplied by the transducer 21 increases, the output voltage of the operational amplifier 22 as seen between terminals 25 and 26 likewise increases. When the voltage between the terminals 25 and 26 becomes greater than the threshold voltage of the diode 31, current will flow from the terminal 25 to the junction point 12 via the diode 31 and the lead 32. This conduction of the diode 31 causes the full output voltage of the operational amplifier 22 minus the voltage drop of the diode to be fed back to the junction point 12. The summing point is thus transferred from terminal 23 to the junction 12 when the diode 31 conducts. Since the voltage at the output terminals 25 and 26 of the operational amplifier 22 is 180° out of phase with the voltage at the junction points 12 and 13, the increase of voltage above 12 millivolts which would otherwise appear between the junctions 12 and 13 is effectively canceled.

Assuming that the voltage applied to the terminals 10 and 11 continues to increase, the current flow through the diode 31 also increases. As current through the diode 31 increases, the resistance of the diode decreases. Consequently, the magnitude of voltage fed back to the junction points 12 and 13 increases thereby preventing the voltage between those terminals from exceeding the predetermined 12 millivolt limit.

The characteristics of the diode 31 are such that the resistance thereof decreases faster than the current therethrough increases and in a nonlinear relationship after the threshold voltage has been exceeded. As a result of these characteristics, after the voltage between the junction points 12 and 13 reaches 12 millivolts, the voltage feedback to those junction points will increase faster than the voltage being supplied to them from the transducer 21 increases. Thus the canceling feedback voltage limits the voltage between the junction points 12 and 13 to the desired predetermined value of 12 millivolts. The diode 31 and the lead 32 comprise what may be termed a nonlinear negative feedback network having a prescribed threshold voltage.

Of course, when the transducer 21 voltage drops to a magnitude at which the voltage between the junction points 12 and 13 would be less than 12 millivolts without the presence of the operational amplifier 22 and its associated networks, the voltage applied to the terminals 23 and 24 becomes sufficiently low as to allow the voltage between the terminals 25 and 26 to drop below the threshold voltage of the diode 31. When this occurs, the diode 31 becomes nonconductive and feedback to the junction point 12 ceases. As a result, the summing point shifts from junction point 12 to terminal 23 where it remains as long as the voltage between the junction points 12 and 13 is below 12 millivolts.

The circuit of FIG. 2 is similar to that shown in FIG. 1 and like parts are identified by like numerals. In the circuit of FIG. 2, terminals 11, 24 and 26 are connected to common grounds 33. Also, the side of the signal amplifier 20 originally connected to the terminal 19 is connected to a ground 33. The circuit of FIG. 2 is thus a single ended input as compared to the differential input of FIG. 1.

Frm the foregoing it will be seen that, in the limiting circuit of the present invention, a signal voltage to be limited is transferred directly from a transducer to a signal amplifier without passing through any other amplifier stages. To limit the signal voltage, an operational amplifier is driven through a dropping resistor by the signal voltage applied to the signal amplifier. The output voltage of the operational amplifier is fed through a nonlinear impedance network to the signal amplifier when the voltage supplied to the signal amplifier tends to exceed a predetermined magnitude thereby canceling the voltage in excess of the predetermined magnitude.

It will be understood that changes and modifications may be made to the foregoing circuitry without departing from the spirit and scope of the invention as set forth in the claims appended hereto.

What is claimed is:

1. In a signal limiting circuit including signal input means adapted to receive a signal from a transducer and signal output means adapted for connection to a signal amplifier, the combination of: isolating means connecting said signal input means to said signal output means; an operational amplifier having an input and an output; voltage dropping means connected between said operational amplifier input and said signal output means to isolate the voltage at the input of said operational amplifier from the voltage at said signal output means; a linear feedback network connected between said output and said input of said operational amplifier to reduce the voltage at said input of said operational amplifier to substantially zero when the voltage between said signal output terminals is below a predetermined magnitude; and, a nonlinear feedback network connected between said output of said operational amplifier and said signal output means whereby, as the output voltage of said operational amplifier increases, the feedback to said signal output means increases faster than the feedback to said input of said operational amplifier to limit the voltage at said signal output means to a predetermined value.

2. The circuit as set forth in claim 1 in which said nonlinear feedback network includes voltage dropping means having a prescribed threshold voltage.

3. The circuit as set forth in claim 1 in which said nonlinear feedback network comprises a unidirectional current conducting device having a prescribed threshold voltage.

4. The circuit as set forth in claim 1 in which said nonlinear feedback network comprises a semiconductor diode.

5. The circuit as set forth in claim 4 in which said linear feedback network comprises a resistor.

6. The circuit as set forth in claim 1 in which said isolating means is a resistor and, said voltage dropping means connected between said operational amplifier input and said signal output means is a resistor.

7. The circuit as set forth in claim 6 in which said nonlinear feedback network includes voltage dropping means having a prescribed threshold voltage.

8. The circuit as set forth in claim 6 in which said nonlinear feedback network comprises a unidirectional current conducting device having a prescribed threshold voltage.

9. The circuit as set forth in claim 6 in which said nonlinear feedback network comprises a semiconductor diode.

10. The circuit as set forth in claim 9 in which said linear feedback network comprises a resistor.

References Cited
UNITED STATES PATENTS

| | | | |
|---|---|---|---|
| 3,041,535 | 6/1962 | Cohran | 330—110 X |
| 3,248,569 | 4/1966 | Weekes | 330—103 X |

ROY LAKE, *Primary Examiner.*

JAMES B. MULLINS, *Assistant Examiner.*